(12) United States Patent
Kuwahara

(10) Patent No.: US 12,296,841 B2
(45) Date of Patent: May 13, 2025

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventor: Takafumi Kuwahara, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 276 days.

(21) Appl. No.: 18/061,547

(22) Filed: Dec. 5, 2022

(65) Prior Publication Data

US 2023/0182761 A1 Jun. 15, 2023

(30) Foreign Application Priority Data

Dec. 10, 2021 (JP) ................. 2021-201150

(51) Int. Cl.
*B60W 50/14* (2020.01)
*B60W 50/10* (2012.01)
*B60W 60/00* (2020.01)

(52) U.S. Cl.
CPC ............ *B60W 50/14* (2013.01); *B60W 50/10* (2013.01); *B60W 60/00* (2020.02); *B60W 2050/146* (2013.01)

(58) Field of Classification Search
None
See application file for complete search history.

(56) References Cited

U.S. PATENT DOCUMENTS

| | | | | |
|---|---|---|---|---|
| 2017/0313323 A1* | 11/2017 | Tseng | ............... | B60W 50/0098 |
| 2018/0211532 A1* | 7/2018 | Aoki | ............... | G08G 1/096725 |
| 2019/0300011 A1* | 10/2019 | Nakano | .................... | G07C 5/02 |
| 2021/0165649 A1* | 6/2021 | Harata | .................. | G06F 3/0679 |
| 2023/0074953 A1* | 3/2023 | Obara | .................... | B60K 35/00 |

FOREIGN PATENT DOCUMENTS

| | | | | |
|---|---|---|---|---|
| JP | 2009-99062 A | | 5/2009 | |
| JP | 2013-210977 A | | 10/2013 | |
| JP | 2014067144 A | * | 4/2014 | |
| JP | 2015-9647 A | | 1/2015 | |
| JP | 2016-197390 A | | 11/2016 | |
| JP | 2017004559 A | * | 1/2017 | |
| JP | 2019-79454 A | | 5/2019 | |
| JP | 2020-183148 A | | 11/2020 | |
| JP | 2021-81886 A | | 5/2021 | |
| JP | 2021-94970 A | | 6/2021 | |
| JP | 2021-140309 A | | 9/2021 | |
| WO | WO-2018179630 A1 | * | 10/2018 | ............ H04L 12/28 |

* cited by examiner

*Primary Examiner* — Khoi H Tran
*Assistant Examiner* — Dairon Estevez
(74) *Attorney, Agent, or Firm* — Oblon, McClelland, Maier & Neustadt, L.L.P.

(57) ABSTRACT

An information processing apparatus comprises a control unit configured to execute: sequentially performing, in a predetermined order, processing of determining whether or not operating conditions for each driving support function are satisfied with respect to each of a plurality of driving support functions included in a first vehicle; and skipping the determinations for unprocessed driving support functions when there is a driving support function for which the operating conditions are determined to be satisfied.

16 Claims, 16 Drawing Sheets

FIG. 3

OPERATING CONDITION DATA

| FUNCTION NAME | PRIORITY | OPERATING CONDITIONS | | DATA SOURCE |
|---|---|---|---|---|
| SEMI-AUTOMATED DRIVING (F001) | 1 | ROAD TYPE | HIGHWAY | NAVIGATION DEVICE |
| | | STATUS OF CRUISE CONTROL FUNCTION | NOT OPERATING | DRIVING SUPPORT ECU |
| | | VEHICLE SPEED | 70 KM/H OR MORE | VEHICLE SPEED SENSOR |
| | | STATUS OF BLINKER | NOT OPERATING | BLINKER SENSOR |
| | | AVERAGE VEHICLE SPEED CHANGE AMOUNT (LAST 20 SECONDS) | 10 KM/H OR LESS | VEHICLE SPEED SENSOR |
| | ... | ... | ... | ... |
| WINDING DRIVING SUPPORT (F004) | 4 | DRIVE MODE | NORMAL MODE | ENGINE ECU |
| | | VEHICLE SPEED | 30 KM/H OR MORE | VEHICLE SPEED SENSOR |
| | | HISTORY OF STEERING OPERATION | OPERATION OF STEERING ANGLE OF 20-90 DEGREES DETECTED THREE TIMES OR MORE IN ONE MINUTE | STEERING SENSOR |
| | | STATUS OF BLINKER | NOT OPERATING | BLINKER SENSOR |
| | ... | ... | ... | ... |
| ECO ROUTE SEARCH (F006) | 6 | STATUS OF NAVIGATION | DESTINATION NOT SET | NAVIGATION DEVICE |
| | | ELAPSED DRIVE TIME | 30 MINUTES OR MORE | ENGINE ECU |
| | | DRIVING DISTANCE | 20 KM OR MORE | ENGINE ECU |
| | | VEHICLE SPEED | 0km/h | VEHICLE SPEED SENSOR |
| | | BRAKE LAMP | LIGHTING | BODY ECU |
| | | REMAINING AMOUNT OF DRIVE BATTERY | 30% OR MORE BUT LESS THAN 50% | HYBRID ECU |
| SNOW MODE (F007) | 7 | OUTSIDE AIR TEMPERATURE | 0 DEGREES OR LESS | OUTSIDE AIR TEMPERATURE SENSOR |
| | | STATUS OF WIPERS | OPERATING | WIPER SENSOR |
| | | DRIVE MODE | OTHER THAN SNOW MODE | ENGINE ECU |
| | | STATUS OF TRACTION CONTROL FUNCTION | OPERATION HISTORY AVAILABLE | DRIVING SUPPORT ECU |
| ... | ... | ... | ... | ... |

| USER ID | FUNCTION ID | NEED OF NOTIFICATION |
|---|---|---|
| U001 | F001 | NEEDED |
| U001 | F002 | NEEDED |
| U001 | F003 | NOT NEEDED |
| ... | ... | ... |

FIG. 7

| VEHICLE DATA | | | | |
|---|---|---|---|---|
| VEHICLE ID | DATE AND TIME | POSITION INFORMATION | TRAVEL DATA | ID OF DRIVING SUPPORT FUNCTION FOR WHICH OPERATING CONDITIONS WERE ESTABLISHED |
| V00001 | X | (Lat., Lon.) | ... | F001 |

FIG. 10

INFORMATION PROCESSING APPARATUS AND INFORMATION PROCESSING METHOD

CROSS REFERENCE TO RELATED APPLICATION

This application claims the benefit of Japanese Patent Application No. 2021-201150 filed on Dec. 10, 2021 which is hereby incorporated by reference herein in its entirety.

BACKGROUND

Technical Field

The present disclosure relates to driving support functions of a vehicle.

Description of the Related Art

In recent years, vehicles having driving support functions, such as cruise control and semi-automated driving, have become popular.

In this regard, for example, Japanese Patent Application Laid-Open Publication No. 2021-094970 discloses an invention relating to an in-vehicle device that proposes the use of driving support functions to a driver.

SUMMARY

The object of the present disclosure is to improve the convenience of a user who drives a vehicle.

The present disclosure in its one aspect provides an information processing apparatus comprising a control unit configured to execute: sequentially performing, in a predetermined order, processing of determining whether or not operating conditions for each driving support function are satisfied with respect to each of a plurality of driving support functions included in a first vehicle; and skipping the determinations for unprocessed driving support functions when there is a driving support function for which the operating conditions are determined to be satisfied.

The present disclosure in its another aspect provides an information processing method to be executed by an information processing apparatus included in a first vehicle, the method comprising: sequentially performing, in a predetermined order, processing of determining whether or not operating conditions for each driving support function are satisfied with respect to each of a plurality of driving support functions included in a first vehicle; and skipping the determinations for unprocessed driving support functions when there is a driving support function for which the operating conditions are determined to be satisfied.

In addition, another aspect of the present disclosure there is mentioned a program for causing a computer to perform the information processing method, or a computer-readable storage medium storing the program in a non-transitory manner.

According to the present disclosure, it is possible to improve the convenience of a user who drives a vehicle.

BRIEF DESCRIPTION OF THE DRAWINGS

FIG. 3 is a view for explaining operating conditions for driving support functions;
FIG. 7 illustrates an example of data defining the presence or absence of a notification for each of the functions;
FIG. 10 is a view for explaining vehicle data transmitted from the vehicle.

DESCRIPTION OF THE EMBODIMENTS

Figure 1:
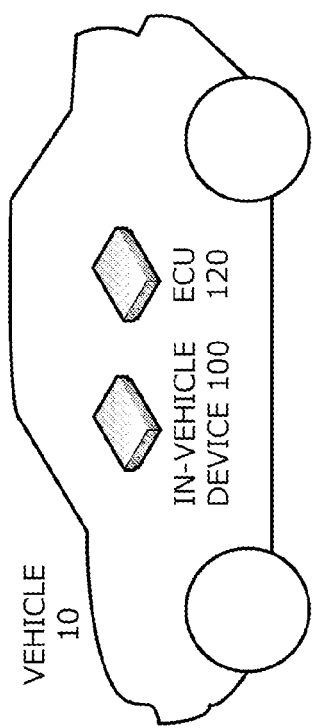
FIG. 1 is a schematic diagram of a vehicle system according to a first embodiment.

In recent years, vehicles having driving support functions have become popular. As the driving support functions, there may be mentioned, for example, an adaptive cruise control function, a steering assist function, a function of appropriately distributing power according to road conditions, and a remote parking function.

These driving support functions are often made available when a host or subject vehicle satisfies predetermined conditions. For example, in order to start semi-automated driving in a highway, it is necessary to satisfy a plurality of conditions such as (1) that the vehicle is traveling on a predetermined highway, (2) that the vehicle is traveling within a predetermined speed range, and (3) that the vehicle is not changing lanes. In the present disclosure, such conditions are referred to as operating conditions (for a driving support function).

There is a technology to inform a driver that a vehicle satisfies operating conditions for a driving support function. For example, in cases where operating conditions are met for any one of a plurality of driving support functions included in the vehicle, it is possible to output an announcement recommending the use of that function via an in-vehicle device.

In such a system, it is necessary to constantly monitor whether or not operating conditions are satisfied with respect to each of the plurality of driving support functions while the vehicle is running.

On the other hand, there is a problem that the load on an in-vehicle device for determining operating conditions is increasing with the diversification of driving support functions in recent years.

An information processing apparatus according to the present disclosure solves such a problem.

An information processing apparatus according to one aspect of the present disclosure is characterized by including a control unit configured to execute: sequentially performing, in a predetermined order, processing of determining whether or not operating conditions for each driving support function are satisfied with respect to each of a plurality of driving support functions included in a first vehicle; and skipping the determinations for unprocessed driving support functions when there is a driving support function for which the operating conditions are determined to be satisfied.

The information processing apparatus can determine whether or not the operating conditions for each driving support function are satisfied with respect to each of the plurality of driving support functions, and when there is a driving support function for which the operating conditions are satisfied, it can notify the driver of the first vehicle to that effect.

However, when operating conditions are established for a plurality of driving support functions at the same time, it is not possible to notify all of them, so that the resources consumed for making determinations may be wasted. Further, even when the vehicle is in an environment where operating conditions are clearly not established for a certain driving support function, determinations may be mechanically and repeatedly executed.

In order to cope with this, the information processing apparatus according to the present disclosure skips determinations for unprocessed driving support functions when it is determined that operating conditions are satisfied with respect to any one of the plurality of driving support functions. For example, when there are ten types of driving support functions and operating conditions are established for a second function in the process of determinations, determinations are omitted for the remaining eight types of functions. This makes it possible to save the resources of the apparatus.

The predetermined order may be a predetermined order of priority.

The priority may be determined based on the probability that operating conditions are established. For example, a lower priority may be given to a driving support function for which the probability of its operating conditions being established is lower. In other words, it becomes possible to appropriately allocate resources by increasing the priority of a driving support function for which the probability of its operating conditions being established is higher.

In addition, the priority may be determined based on the type of a sensor used for the determination. For example, a lower priority may be given to a driving support function for which a determination is made using a sensor whose output varies less, such as a rainfall sensor or a snowfall sensor.

Hereinafter, specific embodiments of the present disclosure will be described based on the accompanying drawings. The hardware configuration, module configuration, functional configuration, and the like described in each embodiment are not intended to limit the technical scope of the disclosure only to them unless otherwise specified.

First Embodiment

An outline of a vehicle system according to a first embodiment will be described with reference to FIG. 1. The vehicle system according to the present embodiment is configured to include a vehicle 10.

The vehicle 10 is capable of providing a plurality of driving support functions. The plurality of driving support functions each become available under predetermined conditions.

The vehicle 10 determines whether or not operating conditions for each of the plurality of driving support functions are satisfied while the vehicle 10 is running. In addition, when there is a driving support function for which the operating conditions are satisfied, the vehicle 10 outputs a notification that the driving support function can be used. Thus, the driver of the vehicle 10 can recognize that there is an available driving support function while the vehicle is running.

The vehicle 10 is configured to include an in-vehicle device 100 and an electronic control unit 120 (also referred to as an ECU). Note that a single ECU is illustrated in FIG. 1, but the vehicle 10 may include a plurality of ECUs.

Figure 2:
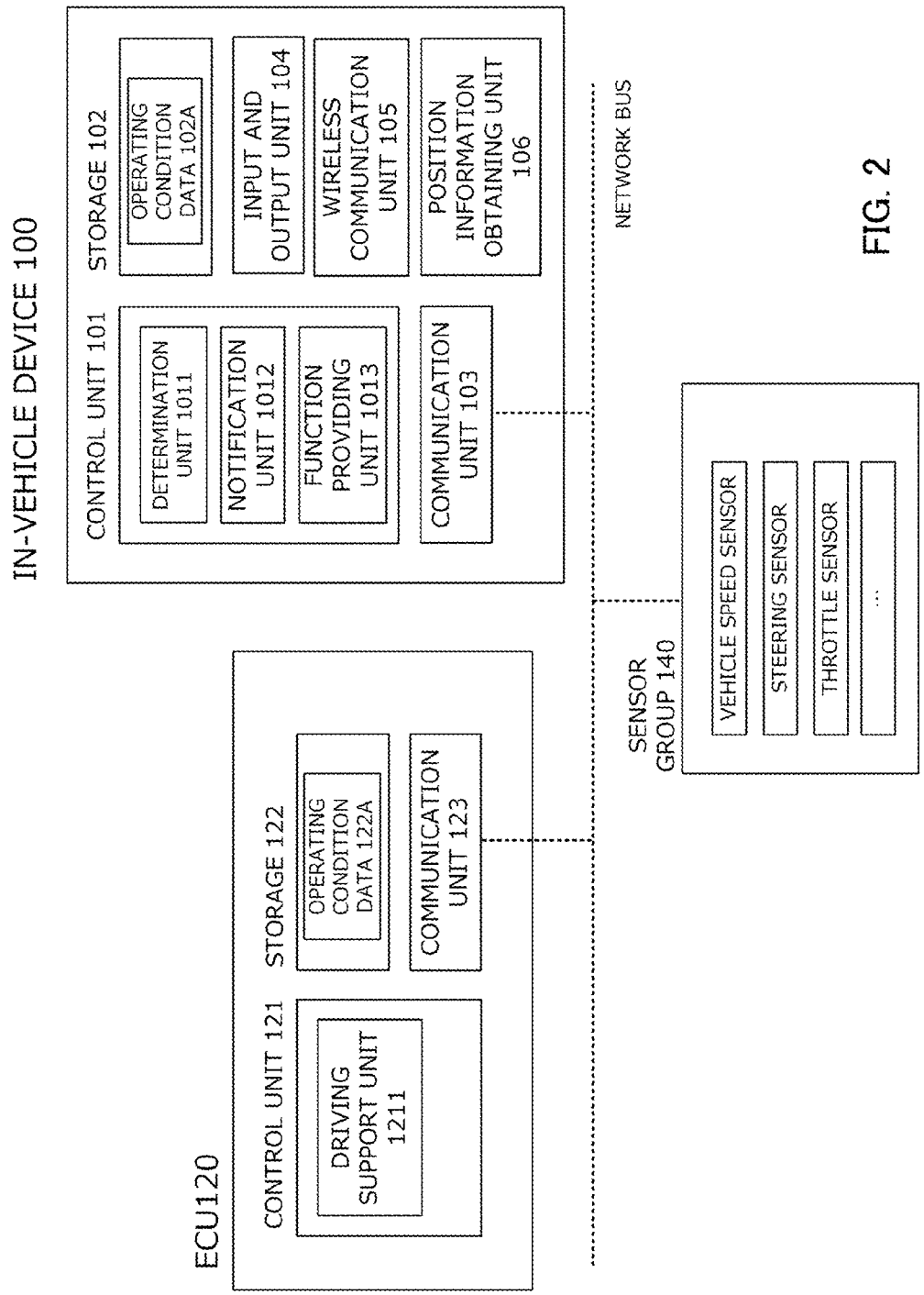
FIG. 2 is a view for explaining component elements included in a vehicle according to the first embodiment.

FIG. 2 is a view for explaining component elements included in the vehicle 10 according to the present embodiment. The vehicle 10 according to the present embodiment is configured to include a sensor group 140 in addition to the in-vehicle device 100 and the ECU 120.

Although a single ECU is illustrated in this example, the vehicle 10 may include a plurality of ECUs that manage different vehicle components. As the plurality of ECUs, there can be mentioned, for example, a body ECU, an engine ECU, a hybrid ECU, a powertrain ECU and the like. Also, the ECU may be divided on a functional basis. For example, it may be divided into an ECU that performs a security function, an ECU that performs an automatic parking function, and an ECU that performs a remote control function.

First, the in-vehicle device 100 will be described.

The in-vehicle device 100 is a device that provides information to an occupant of the vehicle (e.g., a car navigation device). The in-vehicle device 100 is also referred to as a car navigation device, an infotainment device, or a head unit. With the in-vehicle device 100, it is possible to provide navigation and entertainment to the occupant of the vehicle.

In addition, the in-vehicle device 100 has a function of monitoring whether or not the operating conditions for each of the plurality of driving support functions provided by the vehicle 10 are satisfied, and outputting a notification for recommending the use of the driving support function based on the result of monitoring.

The in-vehicle device 100 can be constituted a computer having a processor such as a CPU, a GPU or the like, a main storage device such as a RAM, a ROM or the like, and an auxiliary storage device such as an EPROM, a hard disk drive, a removable medium or the like. An operating system (OS), various programs, various tables, and the like are stored in the auxiliary storage device, and by executing the programs stored therein, it is possible to realize each function that meets a predetermined purpose, as described later. However, some or all of the functions may be implemented by a hardware circuit such as an ASIC or an FPGA.

The in-vehicle device 100 is configured to include a control unit 101, a storage 102, a communication unit 203, an input and output unit 104, a wireless communication unit 105, and a position information obtaining unit 106.

The control unit 101 is an arithmetic unit that realizes the various functions of the in-vehicle device 100 by executing a predetermined program. The control unit 101 may be implemented by a CPU or the like, for example.

The control unit 101 is configured to include three functional modules: a determination unit 1011, a notification unit 1012, and a function providing unit 1013. Each functional module may be implemented by executing a stored program by the CPU.

The determination unit 1011 determines whether or not the operating conditions for each driving support function provided by the ECU 120 are established. The determination unit 1011 obtains control data for controlling the vehicle 10 and sensor data generated by sensors mounted on the vehicle via an in-vehicle network bus to be described later, for example, and determines whether or not the operating conditions are established.

The determination unit 1011 determines a predetermined driving support function based on an instruction from the notification unit 1012 to be described later, and returns the result thereof to the notification unit 1012.

Here, operating conditions for driving support functions will be described.

FIG. 3 is a table illustrating a plurality of driving support functions and their operating conditions. For example, in the illustrated example, the use of a driving support function "snow mode" becomes available when the following conditions are satisfied.
(1) The outside air temperature is 0 degrees or less.
(2) Wipers are operating.
(3) The current driving mode is other than snow mode.
(4) There is a history of the intervention of control by a traction control function.

A list of such operating conditions is held as operating condition data by both the ECU 120 and the in-vehicle device 100.

The determination unit 1011 compares such data with sensor data and the like obtained via the in-vehicle network to determine that the operating conditions for a predetermined driving support function have been established.

The notification unit 1012 determines, via the determination unit 1011, whether or not the operating conditions for each of the plurality of driving support functions included in the vehicle 10 are established while the vehicle 10 is running. In addition, when the operating conditions are established for any of the driving support functions, a notification to that effect is output via the input and output unit 104.

The processing performed by the notification unit 1012 will be described in detail.

Figure 4:
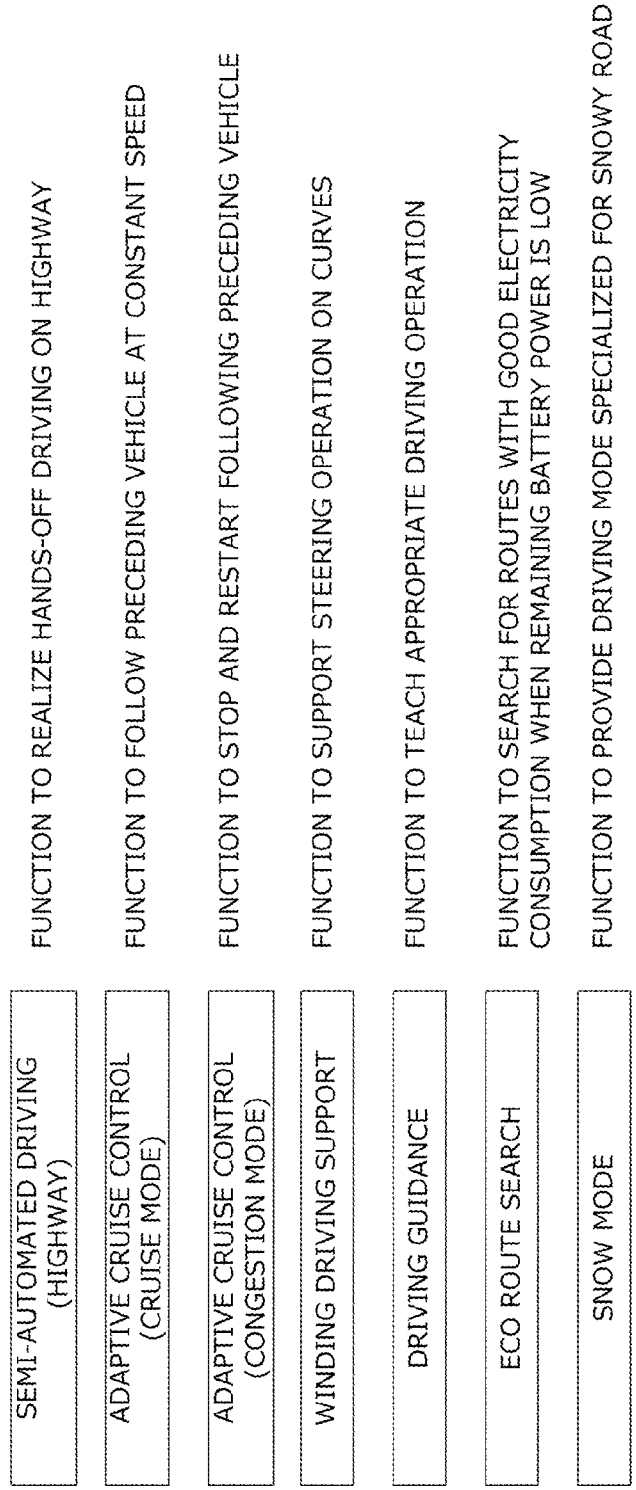
FIG. 4 illustrates an example of a plurality of driving support functions provided in the vehicle.

FIG. 4 is a list of a plurality of driving support functions included in the vehicle 10. Here, seven types of driving support functions are exemplified. The notification unit 1012 periodically determines whether or not the operating conditions are satisfied with respect to each of the seven types of driving support functions, while the vehicle 10 is running.

Normally, when such a notification is made, the in-vehicle device needs to make a determination for each of the seven types of functions. However, if all the functions are subject to determination, the determination may be repeatedly made even for functions for which the probability of their operating conditions is low. For example, in order to provide the driving support function "snow mode", it is necessary that the air temperature is 0 degrees or less, but even in a warm environment, the determination regarding the snow mode may be repeatedly made. Further, in order to provide a driving support function "eco route search", it is necessary that the remaining amount of a drive battery is low, but determination may be repeatedly made even in an environment where the remaining amount of the drive battery is sufficient. In such a case, resources are consumed for useless processing.

In order to prevent this, the in-vehicle device 100 according to the present embodiment makes determinations more preferentially for driving support functions for which the probability of their operating conditions being satisfied is higher, and skips determinations for driving support functions of lower priority when operating conditions are satisfied with respect to any of the driving support functions.

Figure 5:
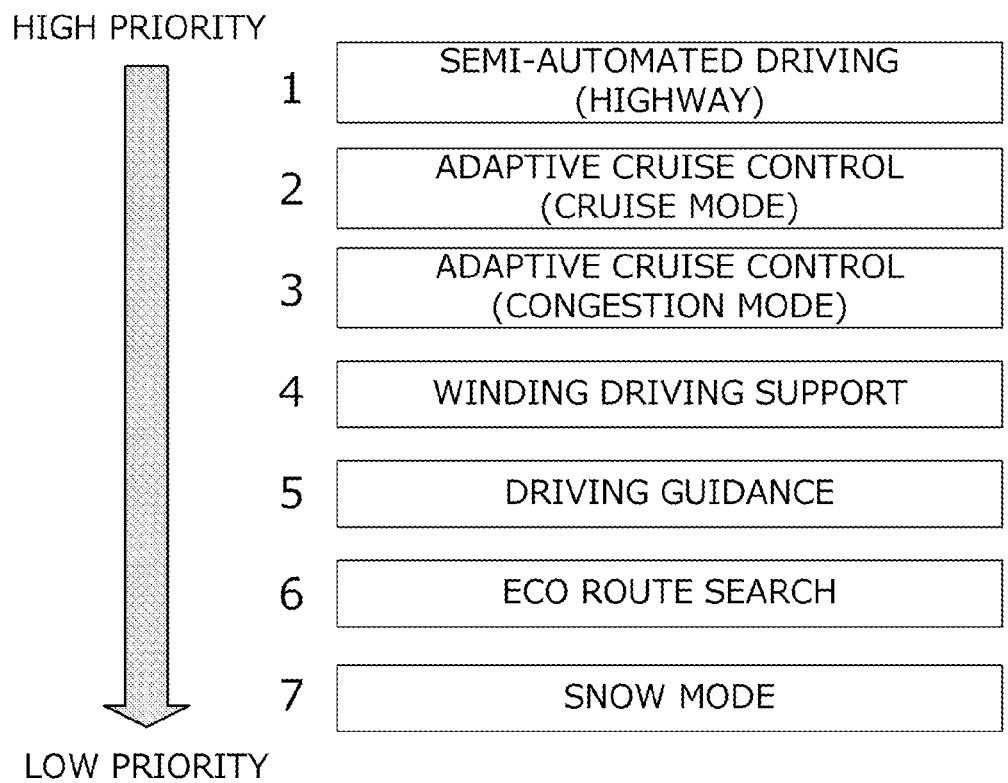
FIG. 5 is a view for explaining the priority of each of the driving support functions.

FIG. 5 is a view in which the seven functions described above are arranged in order of priority. In the illustrated example, determinations are made in order from the driving support function to which the highest priority is assigned, and when there is a driving support function for which the operating conditions are satisfied, determinations are skipped for the driving support functions of lower priority. For example, when the operating conditions are satisfied with respect to a driving support function with a priority of 2, no determination is made with respect to driving support functions with priorities of 3-7. Thus, the resources of the in-vehicle device 100 can be saved.

Here, note that the priority may be set based on the following criteria in addition to the importance of the driving support functions.
(1) Probability Of Operating Conditions Being Established For example, the lower the probability of operating conditions being established for a driving support function, the lower the priority thereof can be made. Thus, it is possible to prevent useless determination processing from being repeatedly executed.
(2) Type Of Sensors To Be Used For example, as compared with sensors closely related to vehicle behavior, such as speed sensors or steering angle sensors, sensors related to the environment, such as those relating to rainfall and snowfall, fluctuate in output less frequently. It is preferable that driving support functions using such sensors have a low determination priority.

Of course, the priority may be set based on other criteria.

The function providing unit 1013 performs various functions provided by the in-vehicle device 100. The functions provided by the in-vehicle device 100 include the following, for example.
Terminal Link Function This is a function to connect the in-vehicle device 100 to a terminal (e.g., smartphone, etc.) owned or carried by an occupant of the vehicle to play music and moving images, mirror a screen, etc.
Audio Function This is a function to reproduce music or songs stored in the storage device.
TV/Radio Function This is a function to receive radio broadcasting and digital television broadcasting.
Navigation Function This is a function to provide route navigation based on map data stored in the storage device.

These functions can be provided, for example, through the input and output unit 104 (touch panel).

The storage 102 is a unit for storing information, and is constituted by a storage medium such as a RAM, a magnetic disk, a flash memory or the like. The storage 102 stores various programs to be executed by the control unit 101, data to be used by the programs, etc. In addition, the storage 102 stores the above-described operating condition data 102A.

The communication unit 103 is a communication interface for connecting the in-vehicle device 100 to a bus of the in-vehicle network.

The input and output unit 104 is a unit to receive an input operation performed by the occupant of the vehicle and to present information to the occupant. Specifically, it is composed of a touch panel with its control unit, and a liquid crystal display with its control unit. The touch panel and the liquid crystal display are composed of one touch panel display in the present embodiment. The input and output unit 104 may include a unit configured to output sound (e.g., an amplifier and a speaker), a unit configured to input sound (a microphone), and the like.

The wireless communication unit 105 includes an antenna and a communication module for performing wireless communication. The antenna is an antenna element for inputting and outputting radio or wireless signals. In the present embodiment, the antenna is compatible with mobile communication (e.g., mobile communication such as 3G, LTE, 5G, etc.). Note, that the antenna may be configured to include a plurality of physical antennas. For example, when mobile communication using radio waves in a high frequency band such as a microwave or a millimeter wave is performed, a plurality of antennas may be arranged in a distributed manner in order to stabilize the communication. The communication module is a module for performing mobile communication.

The position information obtaining unit 106 includes a GPS (Global Positioning System) antenna and a positioning module for measuring position information. The GPS antenna is an antenna that receives positioning signals transmitted from positioning satellites (also referred to as GNSS satellites). The positioning module is a module that calculates the position information based on the signals received by the GPS antenna.

Next, the ECU included in the vehicle 10 will be described.

The ECU is an electronic control unit that controls components included in the vehicle 10. The vehicle 10 may include a plurality of ECUs. The plurality of ECUs control components of mutually different systems such as an engine system, an electrical system, a power train system, etc. The ECUs each have a function to generate a prescribed message and to periodically transmit and receive the message via the in-vehicle network. The ECU 120 is one of the plurality of ECUs.

The ECU 120 is an electronic control unit that provides a plurality of driving support functions. The ECU 120 provides the driving support functions based on the instructions of the driver. In cases where the driving support functions serve to support the driving operation of the vehicle, the ECU 120 may transmit a steering control command, a throttle control command, a power distribution command, or the like to another ECU that controls the vehicle. Each of the plurality of driving support functions can be provided when predetermined conditions are satisfied.

Similarly to the in-vehicle device 100, the ECU 120 can be configured as a computer having a processor such as a CPU, a GPU or the like, a main storage device such as a RAM, ROM or the like, and an auxiliary storage device such as an EPROM, a disk drive, a removable medium or the like.

The ECU 120 is configured to include a control unit 121, a storage 122, and a communication unit 123.

The control unit 121 is an arithmetic unit that realizes the various functions of the ECU 120 by executing a predetermined program. The control unit 121 may be implemented by a CPU or the like, for example.

The control unit 121 is configured to include a driving support unit 1211 as a functional module. The functional module may be realized by executing a stored program by the CPU.

The driving support unit 1211 provides the driving support functions to the driver of the vehicle 10.

The driving support functions are provided based on the instructions of the driver. For example, when an operation for activating a predetermined driving support function is performed via a hardware switch, a touch panel, or the like, the driving support unit 1211 determines whether or not operating conditions for this driving support function are established, and when they are established, the provision of this driving support function is started. Here, note that in cases where the operating conditions for the predetermined driving support function are not established, the operation itself for making the predetermined driving support function valid may be disabled. For example, a menu displayed on the touch panel display may be hidden.

The driving support unit 1211 provides a driving support function by transmitting, for example, a steering control command, a throttle control command, a power distribution command and the like to another ECU for controlling the vehicle.

Here, note that the driving support functions in the present embodiment assist the driving operation of the driver, but the driving support functions do not necessarily have to assist the driving operation. For example, a driving support function may be provided by the in-vehicle device 100. For example, it is possible to provide a function that does not intervene in the driving operation, such as searching for and proposing a route with less electricity consumption when the remaining amount or power of the drive battery is low.

The storage 122 is a unit for storing information, and is constituted by a storage medium such as a RAM, a magnetic disk, a flash memory or the like. The storage 122 stores various programs to be executed by the control unit 121, data to be used by the programs, etc. In addition, the storage 122 stores operating condition data 122A similar to that stored in the in-vehicle device 100.

The communication unit 123 is a communication interface for connecting the ECU 120 to a bus of the in-vehicle network.

The sensor group 140 is a set of a plurality of sensors included in the vehicle 10. In the present embodiment, the in-vehicle device 100 (or the ECU 120) uses sensor data obtained by the sensors included in the sensor group 140 in order to determine whether or not the operating conditions for the predetermined driving support function are established.

The sensor group 140 includes sensors that obtain sensor data relating to the driving operation, such as, for example, a vehicle speed sensor for obtaining a vehicle speed, a steering sensor for obtaining a steering operation angle, and a throttle sensor for obtaining a throttle opening.

Note that the sensor group 140 may include sensors that obtain operations other than driving. As such a sensor, there can be mentioned, for example, a sensor for obtaining an operating state of a wiper or a blinker (turn signal).

In addition, sensors for obtaining other elements may be included in the sensor group 140. For example, the sensor group 140 may include a temperature sensor and a rainfall sensor. The sensor data obtained by each sensor is transmitted to the ECU 120 or the in-vehicle device 100 via a network bus.

The network bus is a communication bus that constitutes the in-vehicle network. Although one bus is illustrated in this example, the vehicle 10 may have two or more communication buses. A plurality of communication buses may be connected to each other by a gateway that organizes the plurality of communication buses.

Here, note that the configuration illustrated in FIG. 2 is merely an example, and all or part of the functions thus illustrated may be executed by using a circuit designed for exclusive use. The programs may be stored or executed by a combination of a main storage device and an auxiliary storage device other than those illustrated in the figure.

Figure 6:
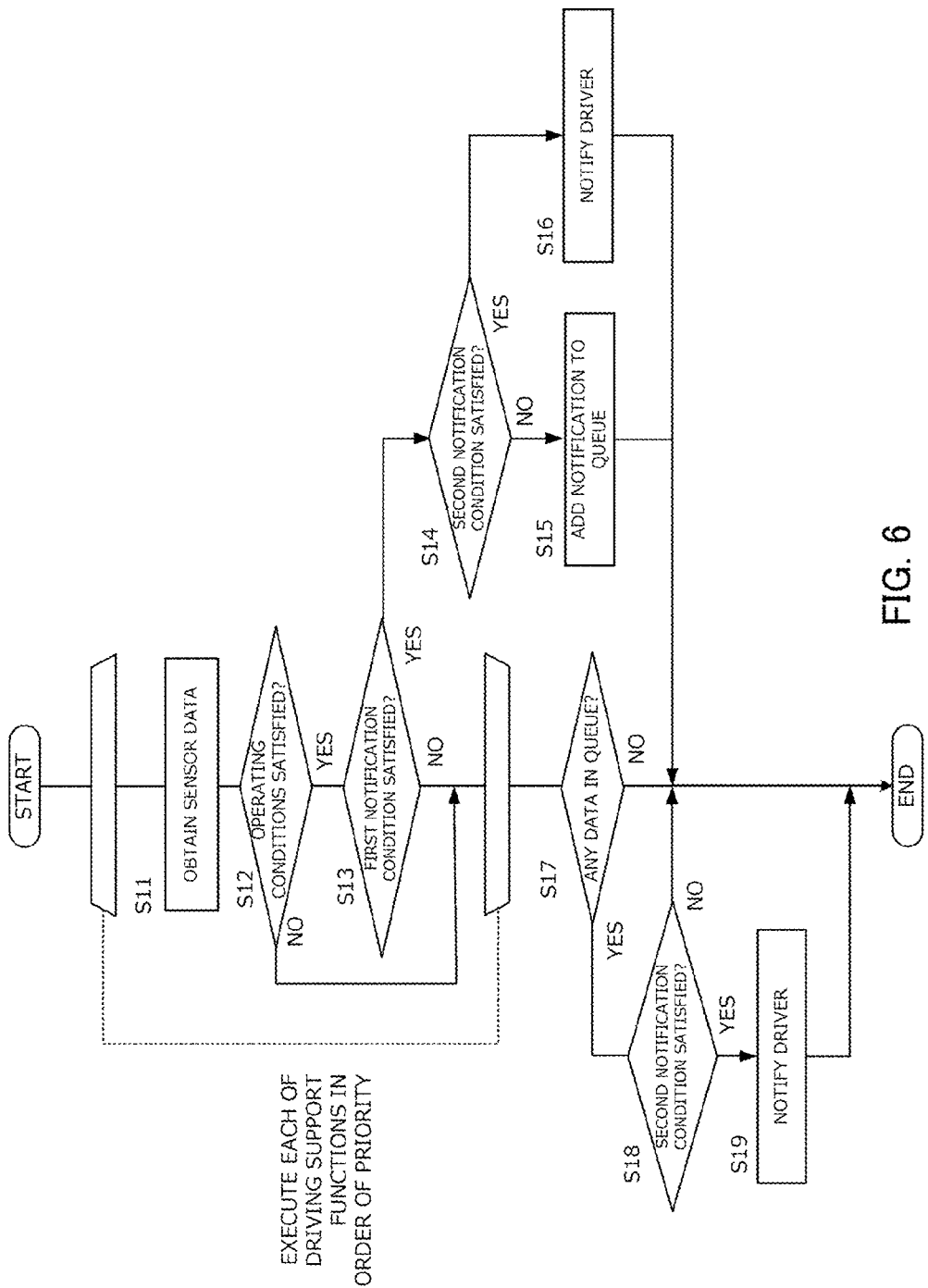
FIG. 6 is a flowchart of processing executed by an in-vehicle device.

Next, the processing executed by the in-vehicle device 100 will be described. FIG. 6 is a flowchart of the processing to be executed by the in-vehicle device 100. The illustrated processing is repeatedly executed at a predetermined cycle while the vehicle 10 is running.

The processing from steps S11 to S13 is individually executed for each of the plurality of driving support functions included in the vehicle 10.

First, in step S11, the determination unit 1011 obtains sensor data.

For example, in the example of FIG. 3, in cases where a "semi-automated driving function" is a target to be determined, the road type, the status of a cruise control function, the vehicle speed, the status of blinkers (turn signals), and the like are to be obtained. The sensor data can be obtained from sensors included in the sensor group 140 or from a plurality of ECUs provided in the vehicle 10.

In step S12, the determination unit 1011 determines whether or not the operating conditions are satisfied with respect to a target driving support function. The determination can be made based on the sensor data and the operating condition data 102A.

When the operating conditions are not satisfied with respect to the target driving support function, the next driving support function is selected according to the priority.

When the operating conditions are satisfied with respect to the target driving support function, the processing proceeds to step S13, where it is determined whether or not a first notification condition is satisfied. The first notification condition is a condition that defines whether or not to notify the driver that the target driving support function can be used. For example, in cases where the driver is familiar with how to use a certain driving support function and does not need to be notified, the driving support function can be excluded from the notification target. FIG. 7 illustrates an example of data defining the need of notification for each of the driving support functions. The data can also be said to be data that defines the driver's preferences. By referring to such data, the notification unit 1012 may make a determination regarding the first notification condition.

Such data may be stored in the storage 102, or may be obtained from an external device (e.g., a server device that manages the vehicle). In this case, the in-vehicle device 100 can obtain data from the external device at a predetermined timing (e.g., at a timing when the ignition is turned on).

When the first notification condition is not satisfied, the next driving support function is selected according to the priority. On the other hand, when the first notification condition is satisfied, the processing proceeds to step S14.

In step S14, it is determined whether or not a second notification condition is satisfied. The second notification condition is a condition that defines whether or not a notification is made in real time. For example, if a notification is made while the blinkers are operating or when the inter-vehicle distance between the subject vehicle and the preceding vehicle is not sufficient, the attention of the driver may be distracted. In this step, it is determined whether or not the vehicle 10 is in such a situation. Note that data relating to the second notification condition may have been stored in the storage 102.

Figure 8:
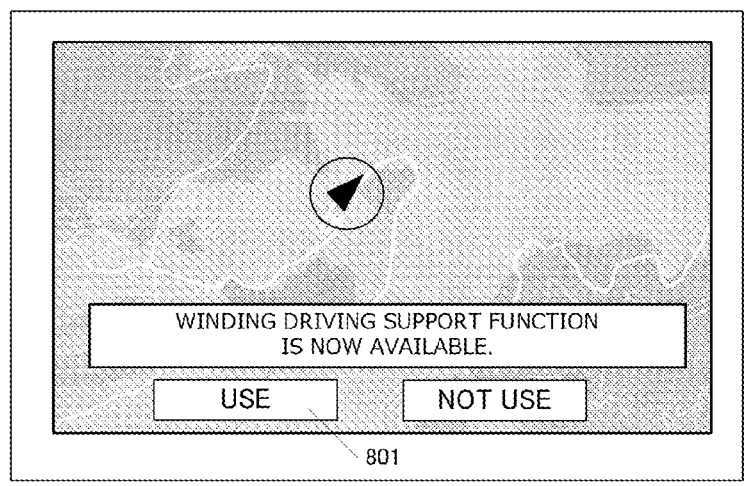
FIG. 8 illustrates an example of a notification given to a driver.

When the second notification condition is satisfied, i.e., when a notification can be made in real time, the processing proceeds to step S16, where the notification unit 1012 outputs, via the input and output unit 104, a notification that the corresponding driving support function can be used. The notification can be made, for example, by a screen display or voice. FIG. 8 illustrates an example of a notification to be output via a screen.

Here, note that in this step, an operation for enabling the corresponding driving support function may be received from the driver. In the example of FIG. 8, when an area 801 is tapped, the in-vehicle device 100 instructs the ECU 120, which provides the driving support function, to enable the corresponding driving support function.

On the other hand, when the second notification condition is not satisfied, i.e., when the vehicle 10 is in a situation where a notification cannot be made in real time, the processing proceeds to step S15.

In step S15, data relating to the notification is added to a notification queue. The notification queue is a list that temporarily holds notification contents in order to make a post-notification. The notification added to the notification queue is output at the timing when the second notification condition is satisfied.

In steps S11-S13, when there is no driving support function for which the operating conditions are not satisfied, the processing proceeds to step S17.

In step S17, it is determined whether or not data exists in the notification queue. In this step, when data exists in the notification queue, the processing proceeds to step S18, where it is determined whether or not the second notification condition is satisfied. As a result, when the second notification condition is satisfied, then in step S19, the notification unit 1012 outputs a notification that the corresponding driving support function can be used. On the other hand, when the second notification condition is not satisfied, or when no data exists in the notification queue, the processing ends.

Here, note that when the operating conditions are no longer satisfied at the timing of executing the step S19, no notification may be made.

As described above, the notification unit 1012 determines whether or not the operating conditions are satisfied in order of priority for a plurality of driving support functions, and outputs a notification of the driving support function for which the operating conditions are first determined to be satisfied. In this case, the determination processing itself is omitted for driving support functions with lower priorities than the driving support function. Thus, the resource consumption of the in-vehicle device 100 can be suppressed. In addition, the processing of obtaining sensor data can be reduced, so that the traffic in the in-vehicle network can also be reduced.

Second Embodiment

In the first embodiment, the in-vehicle device 100 gives a notification while the vehicle 10 is running, but the driver may not notice the notification in the case where the notification is given without using voice (e.g., only by an indicator light). On the other hand, some drivers do not use a notification function because they feel a notification by voice or the like is troublesome.

In response to this, in a second embodiment, the in-vehicle device 100 notifies a server device of a point where operating conditions for a predetermined driving support function are satisfied. In addition, the server device posteriorly informs the user of the point at which the operating conditions for the predetermined driving support function were satisfied (in other words, the point at which the predetermined driving support function was available).

According to such a configuration, it becomes possible to notify the user that the predetermined driving support function was available after the fact (e.g., after the vehicle has finished traveling).

Figure 9:
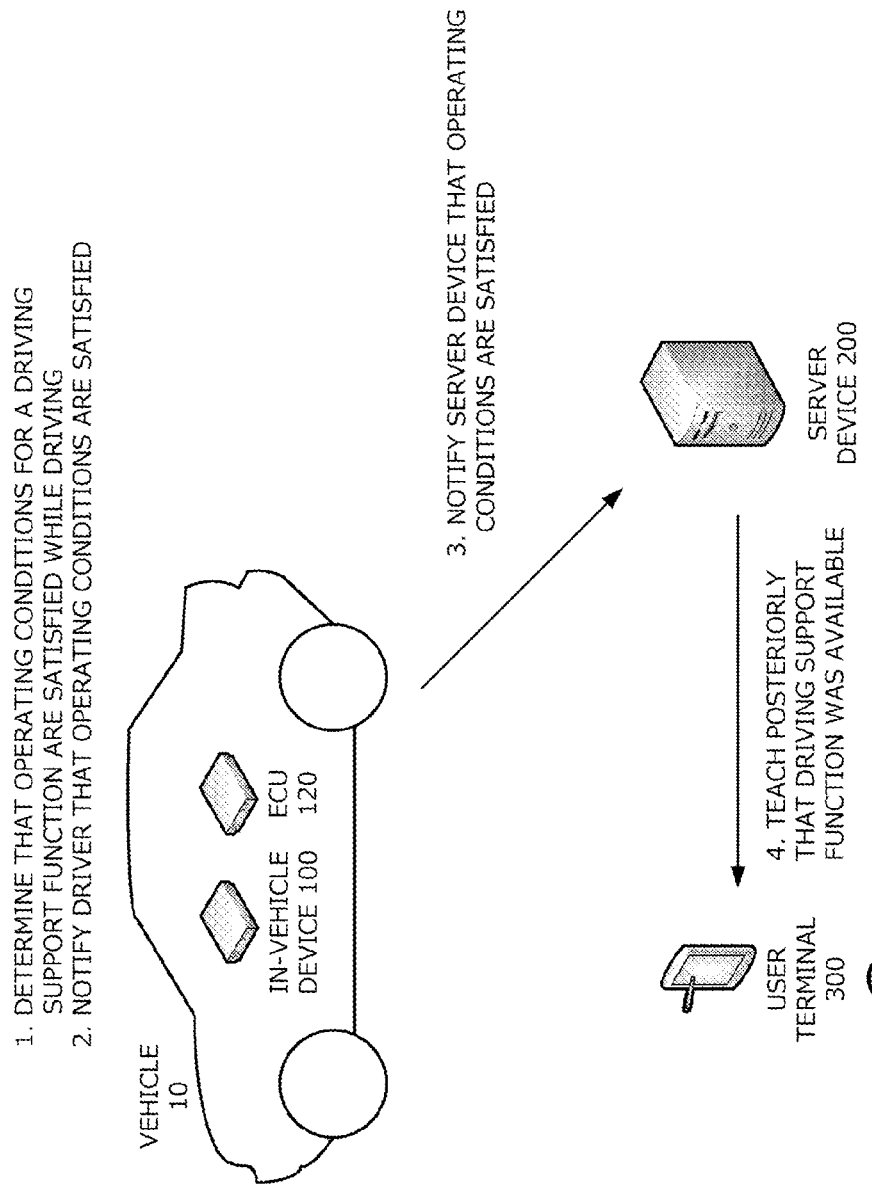
FIG. 9 is a schematic diagram of a vehicle system according to a second embodiment.

FIG. 9 is a system configuration diagram of a server device in the second embodiment. A vehicle system of the second embodiment includes a vehicle 10, a server device 200, and a user terminal 300.

In the second embodiment, the in-vehicle device 100 (i.e., the notification unit 1012) transmits data including the result of the determination made by the determination unit 1011 (hereinafter referred to as vehicle data) to the server device 200 at a predetermined timing. FIG. 10 is an example of vehicle data.

The vehicle data includes an identifier for uniquely identifying a target vehicle 10, the position information (latitude and longitude) of a point where the vehicle data was generated, the result of the determination made by the determination unit 1011, and the like. In the illustrated example, it is shown that at the timing of X, the operating conditions for a driving support function having an identifier of F001 are satisfied.

Here, note that the vehicle data may include other data (travel data) relating to the travel of the vehicle 10. Examples of such data include the speed of the vehicle 10, the direction of travel, information on driving operation (e.g., a throttle opening, a steering operation amount, etc.), and the like. Such data can be obtained based on control data and sensor data flowing through the in-vehicle network.

Now, the server device 200 and the user terminal 300 will be described.

The server device 200 is a computer that collects vehicle data from the vehicle 10 (i.e., the in-vehicle device 100), and provides information to the user terminal 300 based on the vehicle data thus collected.

The user terminal 300 is a computer owned by a user associated with the vehicle 10 (typically, a driver of the vehicle 10).

Figure 11:
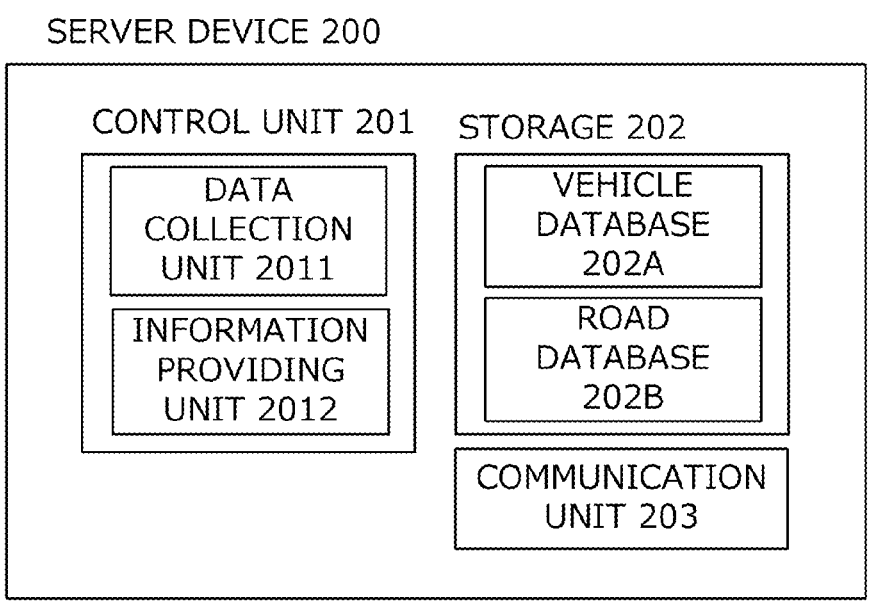
FIG. 11 is a system configuration diagram of a server device in the second embodiment.

FIG. 11 is a diagram illustrating in detail the component elements of the server device 200 included in the vehicle system according to the present embodiment.

The server device 200 can be constituted by a computer having a processor such as a CPU, a GPU or the like, a main storage device such as a RAM, a ROM or the like, and an auxiliary storage device such as an EPROM, a hard disk drive, a removable medium or the like. An operating system (OS), various programs, various tables and the like are stored in the auxiliary storage device, so that the programs stored therein are executed by being loaded into a work area of the main storage device, and the component parts and the like are controlled through the execution of the programs, whereby each function meeting a predetermined purpose as described later can be realized. However, some or all of the functions may be implemented by a hardware circuit such as an ASIC or an FPGA.

The server device 200 is configured to include a control unit 201, a storage 202, and a communication unit 203.

The control unit 201 is an arithmetic unit that manages the control performed by the server device 200. The control unit 201 can be implemented by an arithmetic processing unit such as a CPU or the like.

The control unit 201 is configured to include a data collection unit 2011 and an information providing unit 2012 as functional modules. Each functional module may be implemented by executing a stored program by the CPU.

The data collection unit 2011 performs processing of collecting vehicle data from a plurality of vehicles 10 (i.e., in-vehicle devices 100), and storing the data thus collected in a database.

The information providing unit 2012 generates information for supporting the use of a driving support function based on a request from the user terminal 300, and provides the information to the user terminal 300. To be more specific, the information providing unit 2012 generates, for a designated driving support function, a map for teaching a point where the driving support function was available (i.e., a point where the operating conditions for the driving support function were satisfied), and provides the map to the user terminal 300.

Figure 12A:
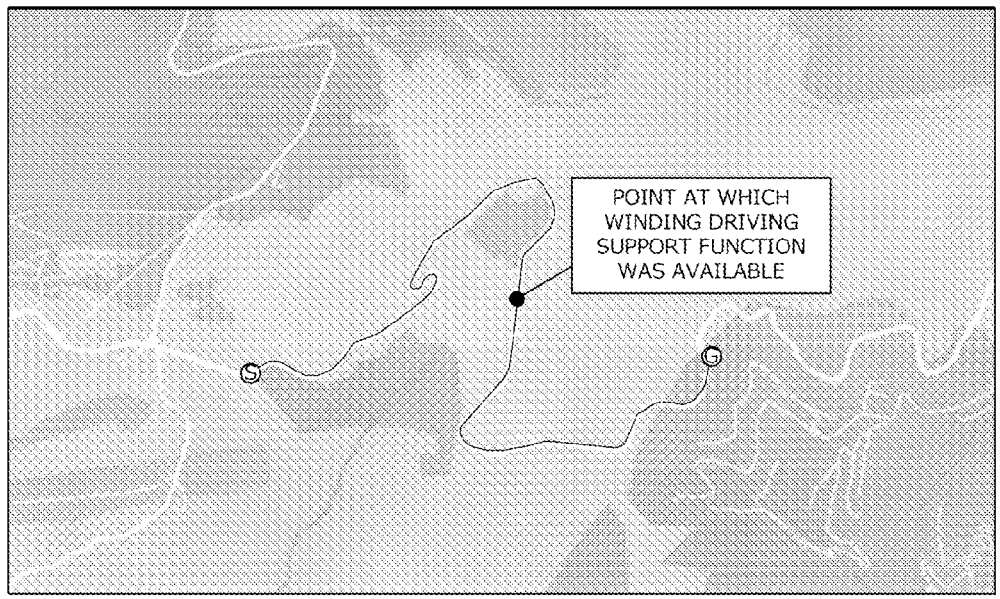
FIGS. 12A and 12B illustrate examples of images output by the server device.
Figure 12B:
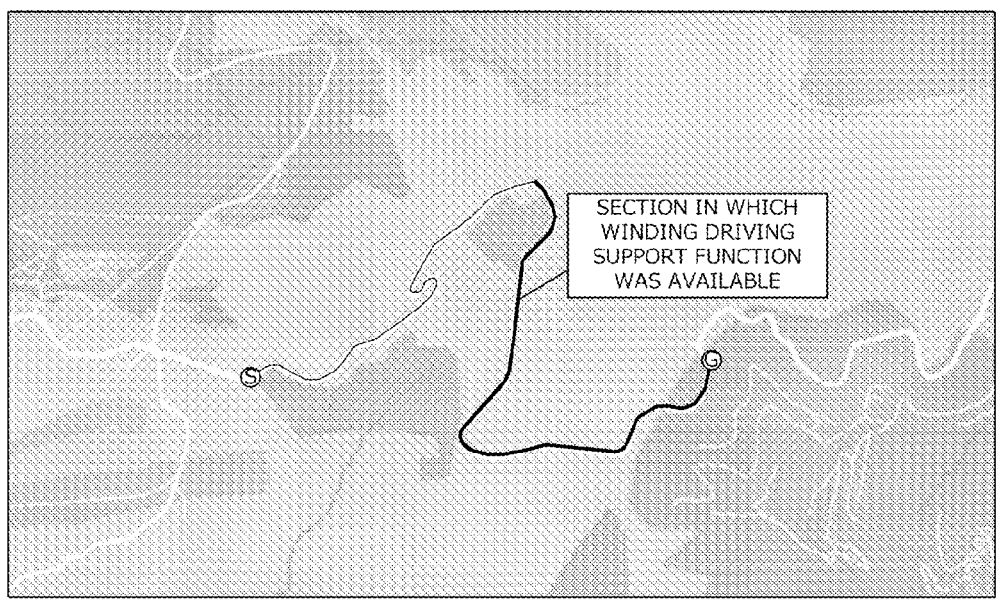

FIG. 12A is an example of a map representing a travel route of the vehicle 10 (hereinafter, referred to as a route map). The information providing unit 2012 refers to the vehicle data of the corresponding vehicle 10, and generates an image by mapping (superimposing) a point where the operating conditions for the driving support function are satisfied on the route map. Here, note that, when the operating conditions for the driving support function continue to be satisfied while the vehicle 10 is running, the corresponding road section may be mapped on the route map, as illustrated in FIG. 12B.

The storage 202 is configured to include a main storage device and an auxiliary storage device. The main storage device is a memory in which control programs to be executed by the control unit 201 and data to be used by the control programs are developed. The auxiliary storage device stores the control programs to be executed in the control unit 201 and data to be used by the control programs.

In addition, the storage 202 stores a vehicle database 202A and a road database 202B.

The vehicle database 202A is a database that stores vehicle data transmitted from a plurality of in-vehicle devices 100 under the management of the system. The vehicle database 202A stores a plurality of vehicle data described with reference to FIG. 10.

The road database 202B is a database that stores road map data. The data stored in the road database 202B are used when the information providing unit 2012 generates the route map.

The communication unit 203 is a communication interface for connecting the server device 200 to a network. The communication unit 203 is configured to include, for example, a network interface board and a wireless communication interface for wireless communication.

The user terminal 300 is a computer owned by a user associated with the vehicle 10 (typically, a driver of the vehicle 10). The user terminal 300 is, for example, a personal computer, a smart phone, a mobile phone, a tablet computer, a personal information terminal, or the like.

The user terminal 300 perform a function of accessing the server device 200 and interacting with the server device 200. This function may be implemented by dedicated application software that runs on the user terminal 300. The control unit 301 performs processing of requesting a route map corresponding to a given vehicle 10 from the server device 200 and processing of outputting the route map received from the server device 200.

Figure 13:
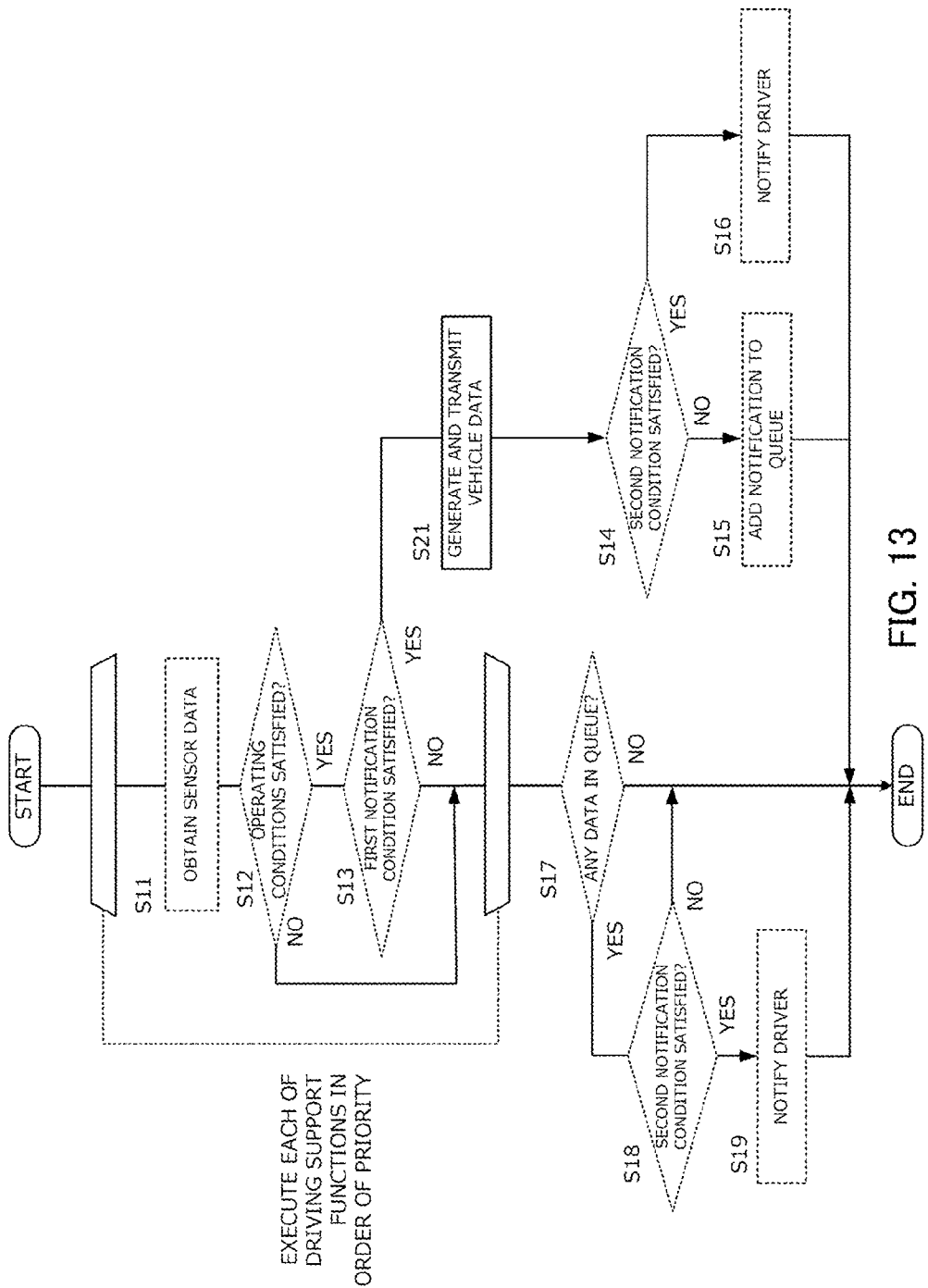
FIG. 13 is a flowchart of processing executed by an in-vehicle device in the second embodiment.

FIG. 13 is a flowchart of processing (routine) to be executed by the in-vehicle device 100 in the second embodiment. Processing similar to those of the first embodiment is indicated by dotted lines, and description thereof is omitted.

In the second embodiment, when the first notification condition is satisfied, the notification unit 1012 generates the vehicle data illustrated in FIG. 10 and transmits it to the server device 200 (step S21).

Figure 14:
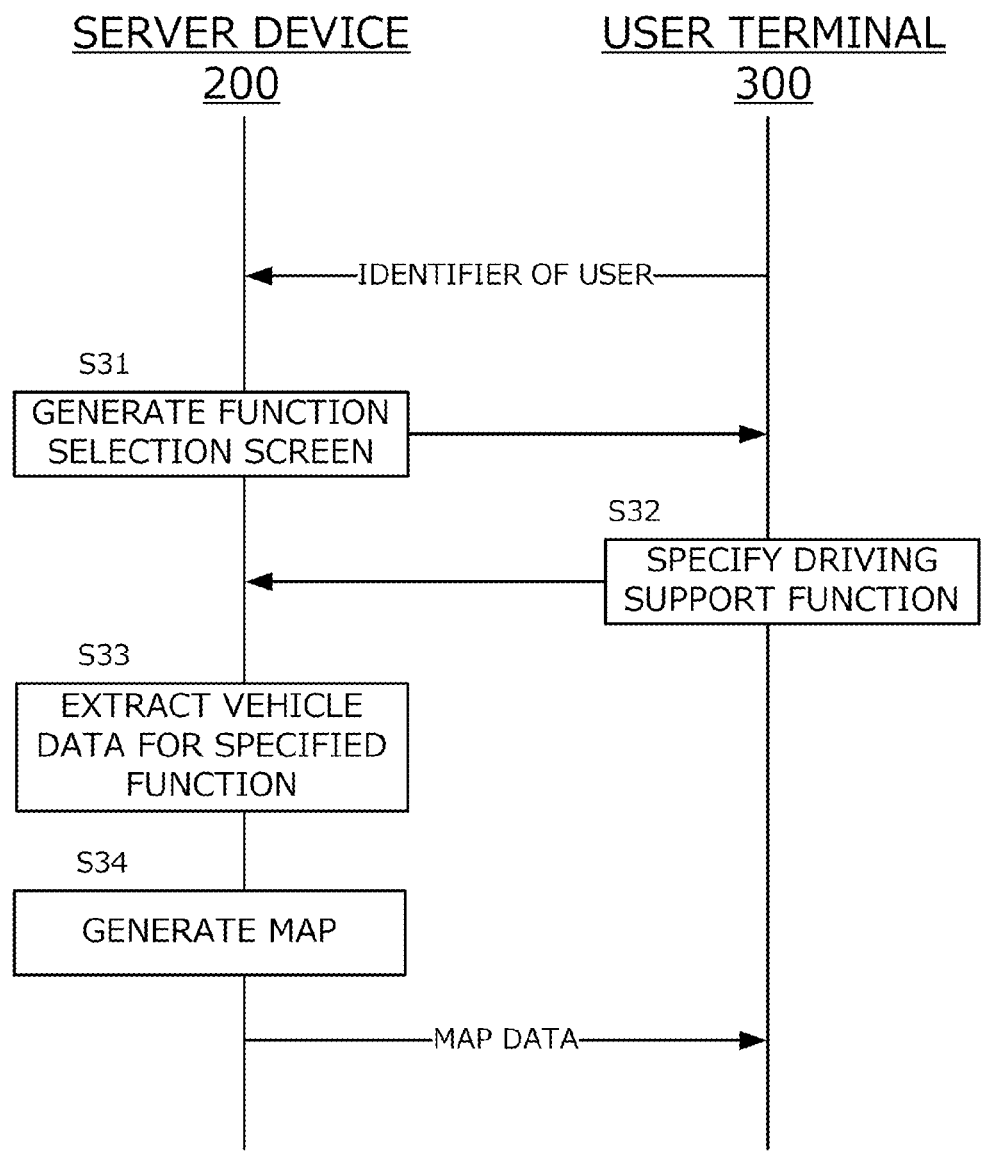
FIG. 14 is a sequence diagram of processing between the server device and a user terminal.

Next, processing in which the user terminal 300 accesses the server device 200 to request a route map will be described. FIG. 14 is a sequence diagram of processing to be executed by the server device 200 and the user terminal 300. The processing is started at the timing when the user terminal 300 activates application software for accessing the server device 200.

First, the user terminal 300 transmits an identifier of its user to the server device 200. The user identifier may have been stored in the user terminal 300 in advance. In this step, the server device 200 specifies an identifier of a target vehicle 10 based on the identifier of the user received from the user terminal 300.

Figure 15:
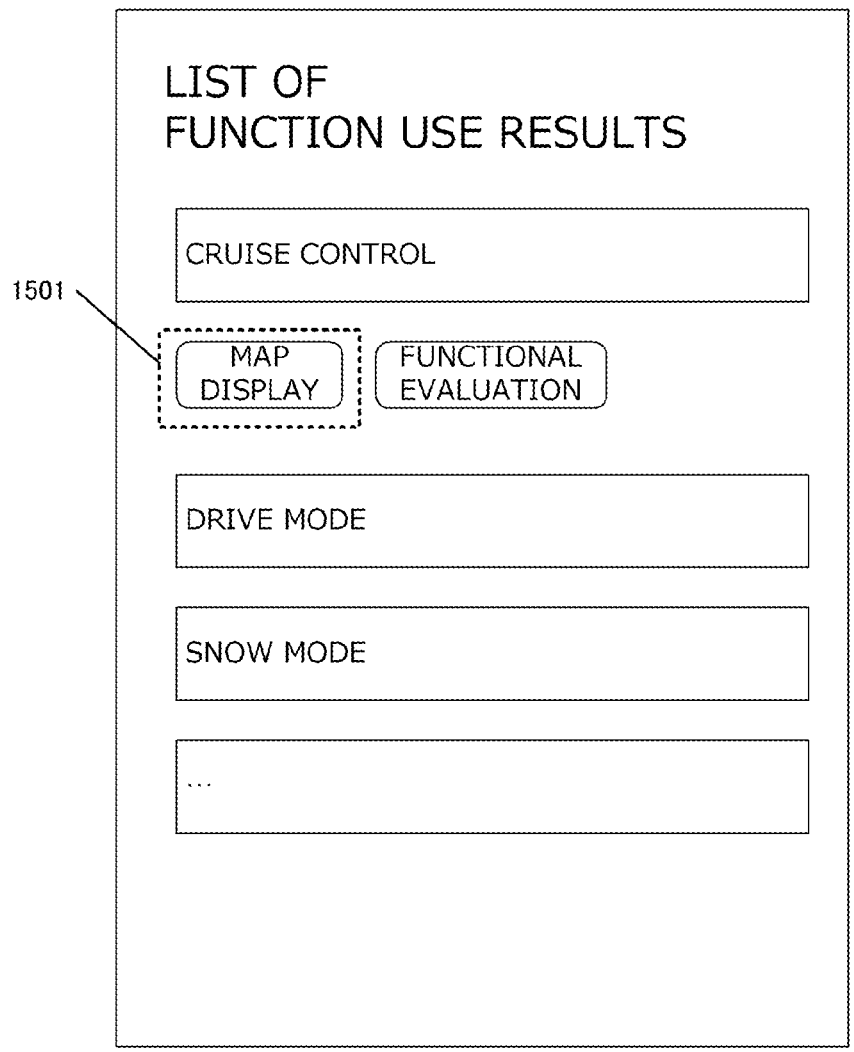
FIG. 15 illustrates an example of a screen generated in step S31.

In step S31, the information providing unit 2012 generates a function selection screen. The function selection screen is a screen for selecting any of a plurality of driving support functions available for the vehicle 10. The driving support functions available for the vehicle 10 may be obtained based on the vehicle database 202A. FIG. 15 illustrates an example of the function selection screen. The function selection screen is transmitted to the user terminal 300.

In step S32, the user terminal 300 outputs the function selection screen and accepts a selection from the user. When the user taps any of the buttons (e.g., a reference numeral 1501), the function thus selected is notified to the server device 200.

In step S33, based on the identifier of the vehicle 10 and the driving support function designated by the user, the information providing unit 2012 extracts a record of the corresponding vehicle data from the vehicle database 202A.

Then, in step S34, the information providing unit 2012 generates a user interface screen for presenting a route map to the user. In addition, the information providing unit 2012 generates a graphic for teaching the user about a point or a section that satisfies the operating conditions for the driving support function, and superimposes the graphic on the route map. The graphic may be an icon, a figure, or the like.

Figure 16:
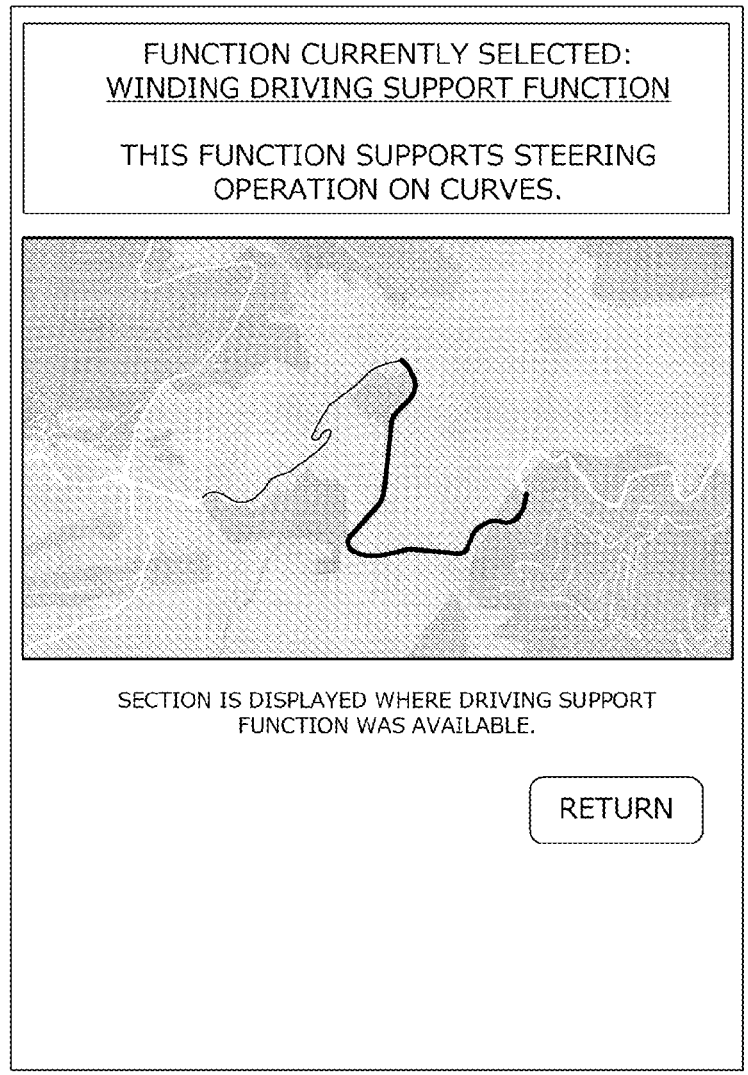
FIG. 16 illustrates an example of a screen generated in step S34.

Based on the vehicle data extracted in step S33, the information providing unit 2012 determines the point (or road section) at which the operating conditions for the designated driving support function are satisfied, and superimposes the graphic representing the point (or road section) on the route map. FIG. 16 is an example of an image in which a graphic showing a section in which the operating conditions for the designated driving support function are satisfied is superimposed on the route map.

As described above, in the second embodiment, the server device generates and provides a map for teaching a point where the operating conditions for a driving support function are satisfied. Thus, the user can recognize, after the fact, that a predetermined driving support function was available.

Here, note that if the driver has been notified while the vehicle 10 is running, or if a corresponding driving support function is being used, redundant notification may be avoided. For this reason, a flag for identifying the presence or absence of a notification during driving or the presence or absence of the use of the driving support function may be added to the vehicle data. In addition, based on the flag, the server device may determine the presence or absence of teaching for each point (section).

(Modification)

The above-described embodiments are merely examples, but the present disclosure can be implemented with appropriate modifications without departing from the spirit thereof.

For example, the processing and/or means (devices, units, etc.) described in the present disclosure can be freely combined and implemented as long as no technical contradiction occurs.

In addition, the processing described as being performed by one device may be shared and executed by a plurality of devices. Alternatively, the processing described as being performed by different devices may be executed by one device. In a computer system, what hardware configuration (server configuration) realizes each function can be flexibly changed.

The present disclosure can also be realized by supplying a computer program including the functions described in the above embodiments to a computer and causing one or more processors included in the computer to read and execute the program. Such a computer program may be provided to the computer by a non-transitory computer-readable storage medium connectable to a system bus of the computer, or may be provided to the computer via a network. Examples of non-transitory computer readable storage media include: any type of disk such as a magnetic disk (floppy (registered trademark) disk, hard disk drive (HDD), etc.), an optical disk (CD-ROM, DVD disk, Blu-ray disk, etc.); and any type of medium suitable for storing electronic instructions, such as read-only memory (ROM), random access memory (RAM), EPROM, EEPROM, magnetic cards, flash memory, and optical cards.

What is claimed is:

1. An information processing apparatus comprising processing circuitry configured to:
   receive data from a sensor associated with a target driving support function with respect to each of a plurality of driving support functions included in a first vehicle;
   sequentially perform, in a predetermined order of priority, processing of determining whether or not operating conditions for each driving support function are satisfied with respect to each of the plurality of driving support functions included in the first vehicle in response to the received data;
   skip the determinations for whether the operating conditions are satisfied for unprocessed driving support functions when there is a driving support function for which the operating conditions are determined to be satisfied;
   by referring to data that defines preferences of an occupant of the first vehicle, determine whether to notify the occupant that the target driving support function for which the operating conditions are determined to be satisfied can be used;
   in a case where the occupant of the first vehicle needs to be notified that the target driving support function for which the operating conditions are determined to be satisfied can be used, notify the occupant of the first vehicle that the target driving support function for which the operating conditions are determined to be satisfied can be used;
   receive an operation from the occupant for enabling the target driving support function; and
   control the first vehicle to perform the target driving support function in response to receiving the operation from the occupant.

2. The information processing apparatus according to claim 1, wherein the processing circuitry is further configured to:
  determine whether blinkers are operating and whether inter-vehicle distance between the first vehicle and a preceding vehicle is sufficient in a case where the occupant of the first vehicle needs to be notified that the target driving support function for which the operating conditions are determined to be satisfied can be used; and
  notify, in real time, the occupant of the first vehicle that the target driving support function for which the operating conditions are determined to be satisfied can be used in a case where the blinkers are not operating and the inter-vehicle distance is sufficient.

3. The information processing apparatus according to claim 1, wherein the processing circuitry is further configured to:
  suppress a notification to the occupant of the first vehicle when the first vehicle does not satisfy a predetermined condition.

4. The information processing apparatus according to claim 1, wherein the processing circuitry is further configured to:
  determine, based on a preference of the occupant of the first vehicle, a driving support function of the plurality of driving support functions that is not subject to the notification.

5. The information processing apparatus according to claim 1, wherein the processing circuitry is further configured to:
  start determining whether the operating conditions are satisfied for the plurality of driving support functions at a predetermined cycle.

6. The information processing apparatus according to claim 1, wherein
  the priority is determined based on the type of a sensor used by each driving support function.

7. The information processing apparatus according to claim 1, wherein
  the priority is determined based on the probability that each driving support function satisfies its operating conditions.

8. The information processing apparatus according to claim 1, wherein the processing circuitry is further configured to:
  notify a predetermined server device of the result of the determination when it is determined that operation conditions are satisfied with respect to any one of the plurality of driving support functions.

9. An information processing method to be executed by an information processing apparatus included in a first vehicle, the method comprising:
  receiving data from a sensor associated with a target driving support function with respect to each of a plurality of driving support functions included in a first vehicle;
  sequentially performing, in a predetermined order of priority, processing of determining whether operating conditions for each driving support function are satisfied with respect to each of the plurality of driving support functions included in the first vehicle in response to the received data;
  skipping the determinations for whether the operating conditions are satisfied for unprocessed driving support functions when there is a driving support function for which the operating conditions are determined to be satisfied;
  by referring to data that defines preferences of an occupant of the first vehicle, determining whether to notify the occupant that the target driving support function for which the operating conditions are determined to be satisfied can be used;
  in a case where the occupant of the first vehicle needs to be notified that the target driving support function for which the operating conditions are determined to be satisfied can be used, notifying the occupant of the first vehicle that the target driving support function for which the operating conditions are determined to be satisfied can be used;
  receiving an operation from the occupant for enabling the target driving support function; and
  controlling the first vehicle to perform the target driving support function in response to receiving the operation from the occupant.

10. The information processing method according to claim 9, further comprising:
  determining whether blinkers are operating and whether inter-vehicle distance between the first vehicle and a preceding vehicle is sufficient in a case where the occupant of the first vehicle needs to be notified that the target driving support function for which the operating conditions are determined to be satisfied can be used; and
  notifying, in real time, an occupant of the first vehicle that the target driving support function for which the operating conditions are determined to be satisfied can be used in a case where the blinkers are not operating and the inter-vehicle distance is sufficient.

11. The information processing method according to claim 9, further comprising:
  suppressing a notification to the occupant of the first vehicle when the first vehicle does not satisfy a predetermined condition.

12. The information processing method according to claim 9, further comprising:
  determining, based on a preference of the occupant of the first vehicle, a driving support function of the plurality of driving support functions that is not subject to the notification.

13. The information processing method according to claim 9, further comprising:
  starting determining whether the operating conditions are satisfied for the plurality of driving support functions at a predetermined cycle.

14. The information processing method according to claim 9, further comprising:
  the priority is determined based on the type of a sensor used by each driving support function.

15. The information processing method according to claim 9, wherein
  the priority is determined based on the probability that each driving support function satisfies its operating conditions.

16. The information processing method according to claim 9, further comprising:
  notifying a predetermined server device of the result of the determination when it is determined that operation conditions are satisfied with respect to any one of the plurality of driving support functions.

* * * * *